United States Patent
Grinnall et al.

(10) Patent No.: US 7,455,513 B2
(45) Date of Patent: Nov. 25, 2008

(54) SYSTEM FOR CREATING BLOW MOLDED CASE

(75) Inventors: Michael L Grinnall, Clinton, IA (US); David W. Cozzens, Clinton, IA (US); Clay Bahnsen, Clinton, IA (US); Steven P. Guidebeck, Clinton, IA (US); James M. Wiese, Clinton, IA (US)

(73) Assignee: Custom-Pak, Inc., Clinton, IA (US)

( * ) Notice: Subject to any disclaimer, the term of this patent is extended or adjusted under 35 U.S.C. 154(b) by 562 days.

(21) Appl. No.: 11/180,230

(22) Filed: Jul. 13, 2005

(65) Prior Publication Data

US 2007/0012704 A1 Jan. 18, 2007

(51) Int. Cl.
*B29C 49/50* (2006.01)

(52) U.S. Cl. .................. 425/527; 425/296

(58) Field of Classification Search .......... 425/527, 425/522, 525, 531, 289, 290, 296; 264/154, 264/163, 531; *B29C 49/50*
See application file for complete search history.

(56) References Cited

U.S. PATENT DOCUMENTS

| | | | |
|---|---|---|---|
| 3,317,955 A | 5/1967 | Schurman et al. | 18/5 |
| 3,327,841 A | 6/1967 | Schurman et al. | 206/1 |
| 3,636,151 A * | 1/1972 | Nagai | 425/525 |
| 4,340,139 A | 7/1982 | Wilcox et al. | 206/349 |
| 4,340,140 A | 7/1982 | Wilcox et al. | 206/373 |
| 4,343,412 A | 8/1982 | Wilcox et al. | 220/342 |
| 4,380,293 A | 4/1983 | Wilcox et al. | 206/342 |
| 4,487,328 A | 12/1984 | Wilcox et al. | 220/241 |
| 4,662,515 A | 5/1987 | Newby, Sr. | 206/349 |
| 5,485,661 A * | 1/1996 | McClure | 27/7 |
| 6,102,156 A * | 8/2000 | Lipniarski | 182/118 |
| 6,375,891 B1 * | 4/2002 | Nishikawa et al. | 425/533 |
| 6,422,386 B1 | 7/2002 | Wiese et al. | 206/373 |
| 6,696,011 B2 * | 2/2004 | Yun et al. | 264/163 |

FOREIGN PATENT DOCUMENTS

| | | | |
|---|---|---|---|
| EP | 1743843 A1 * | 1/2007 | |
| JP | 06182862 A * | 7/1964 | |
| JP | 59049942 A * | 3/1984 | |
| JP | 62009944 A * | 1/1987 | |
| JP | 07214652 A * | 8/1995 | |

* cited by examiner

*Primary Examiner*—Robert B Davis
(74) *Attorney, Agent, or Firm*—St. Onge Steward Johnston & Reens LLC

(57) ABSTRACT

A blow molded case is disclosed generally comprising a double wall, blow molded base portion having inner and outer case walls, and a lid portion connected to the base portion such that the lid, when in a closed position, at least partly covers the inner case wall of the base portion, which accommodates a first object. The outer wall of the base portion has a hole for receiving a second object, such as a drawer or other receptacle. In certain embodiments, the hole is a punched hole, created by extending a punch through a sidewall of the base portion substantially perpendicular to the parting line thereof. In certain embodiments, the sidewall is non-planar, and in some embodiments, the sidewall includes a recess adjacent the hole for easily gripping the second object.

10 Claims, 6 Drawing Sheets

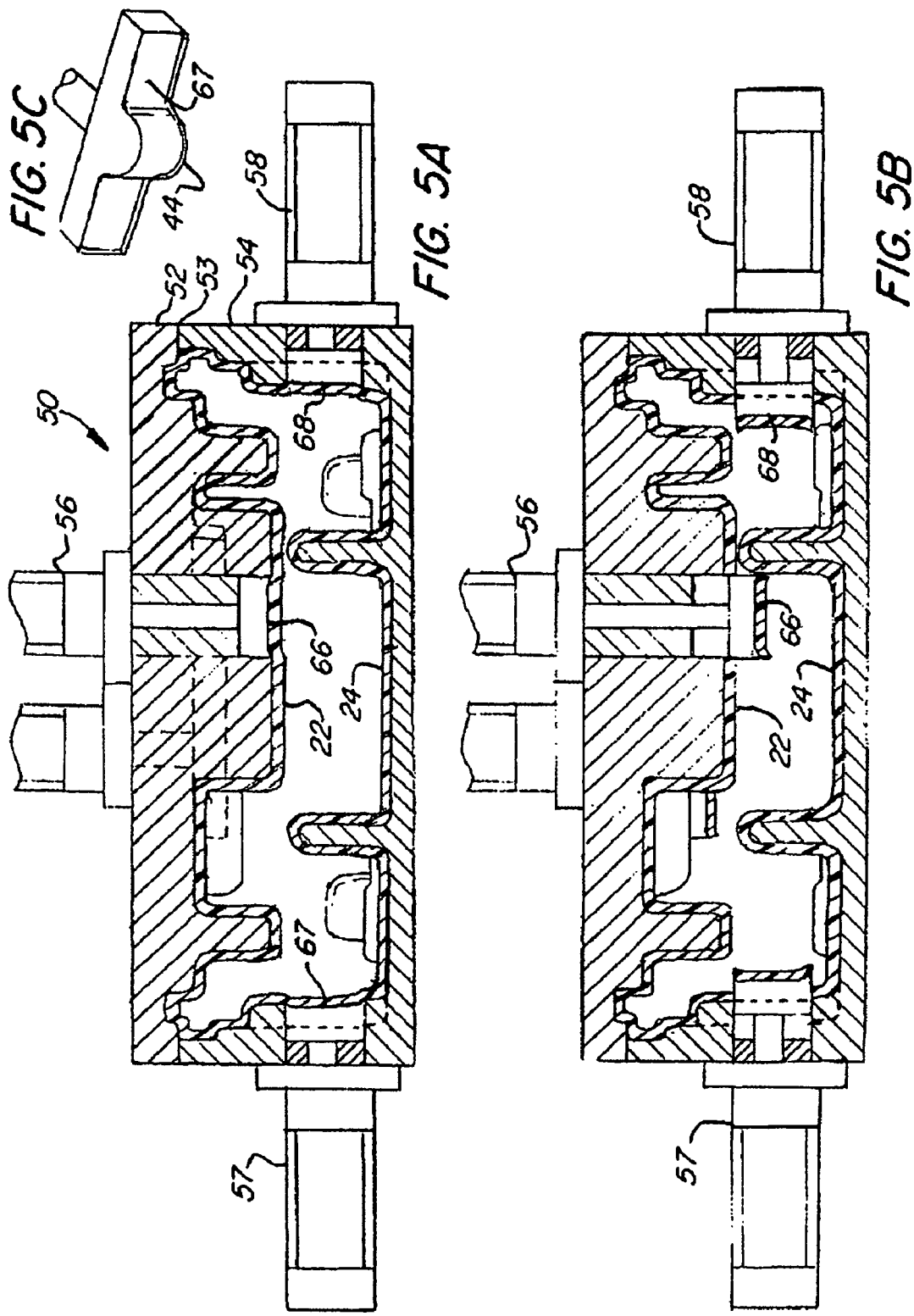

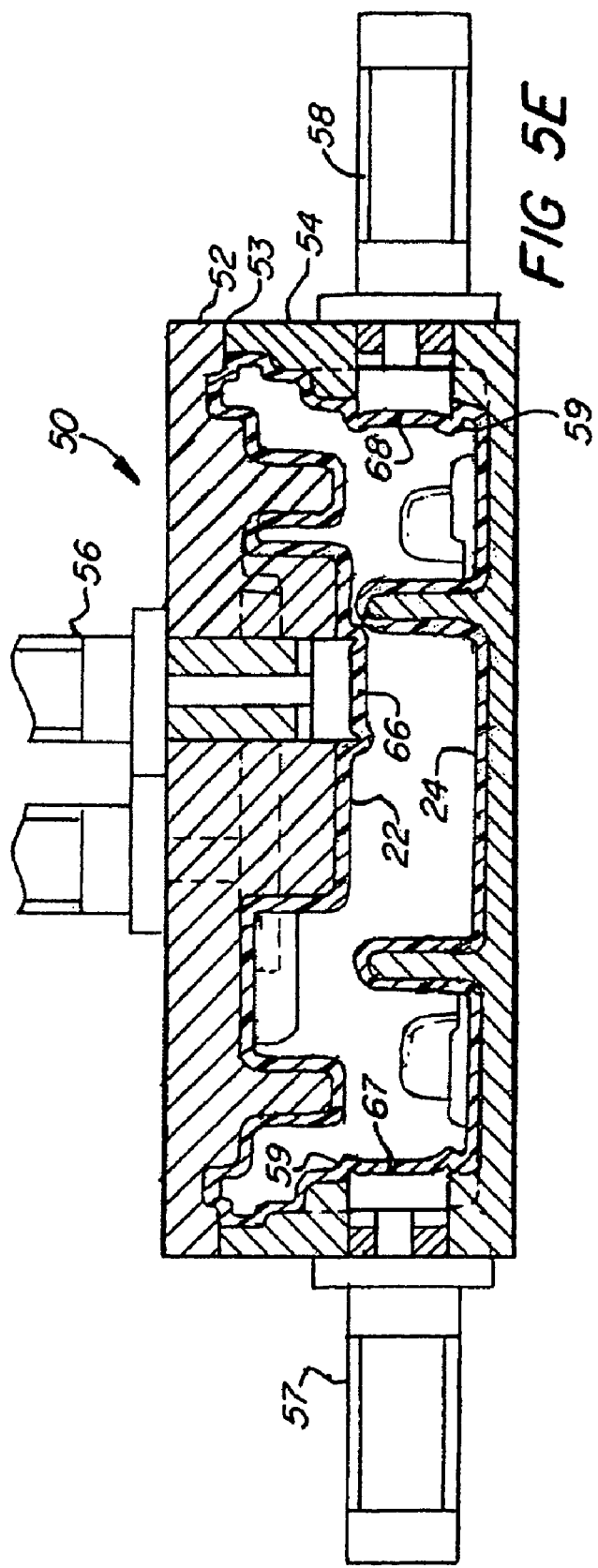

SYSTEM FOR CREATING BLOW MOLDED CASE

FIELD OF THE INVENTION

The present invention relates to blow molded cases. More specifically, the invention relates to blow molded cases having a double wall base portion with a hole in the outer wall thereof for accommodating additional objects, such as drawers or removable containers, as well as a system for creating such cases.

BACKGROUND OF THE INVENTION

The use of blow-molding as a method for manufacturing various sorts of articles is generally well known. Typically, this process involves the use of a mold consisting of two separate halves or portions having cavities of particularly desired shapes and sizes. Usually, one extrudes a large-diameter, sealed tube of molten material (commonly referred to as a "parison"), places the tube between the mold halves, and closes the mold around the tube. Fluid pressure is then introduced into the tube, forcing the molten tube against the walls of the cavities, conforming the tube to the shape thereof. The pressure is maintained until the molten material cools and solidifies. The pressure is then released, the mold halves are pulled apart, and the hardened article is ejected therefrom.

One such article that is commonly manufactured in this manner is double wall cases. By producing cases in this manner, one is able to produce a device that is capable of carrying and protecting tools placed inside the case that has a multitude of desirable physical characteristics—such as rigidity, scuff resistance, and impact absorption—yet that is relatively inexpensive to manufacture. In some instances, these cases are formed as single-piece cases using the process described above, where one mold half forms the exterior of both the base and lid portions of the case, while the other mold half forms the interior of both base and lid portions. Usually, the mold half forming the exterior of the case forms a wall with a smooth, attractive shape, while the mold half that forms the interior of the case is often molded with compartments to hold specific contents. In other instances, the process described above can be used to separately create the base and lid portions of the case, which can subsequently be connected together.

Though such cases are generally well known in the art, efforts have been made to increase the carrying capacity of such cases while reducing the size of the case, as attempts to increase the interior space of the case can quickly increase the weight and size of the case due to its double wall nature. Accordingly, it has been suggested to cut out sections of the interior walls of the case in order to utilize the wasted volume of space between the double walls. By doing so, the case can be made smaller in light of the fact that this previously unused space is now being used to house the objects being carried in the case. Moreover, by removing sections of the walls, the case also decreases significantly in weight.

For example, U.S. Pat. Nos. 3,317,955 and 3,327,841 to Schurman, et al., disclose cases in which a portion of the case wall is cut out after blow-molding. Specifically, the '955 patent, which discloses the earliest known double wall case blow-molded case, illustrates a rectangular cutout of most of the inside wall of the base portion. Similarly, the '841 patent discloses a partial cutout shaped to accommodate the outline of a pistol-type soldering gun, where the gun is further supported by a cradle molded in the outside wall of the base portion of the case, while the space under the uncut portion of the inside base is usable for storage of an electric cord, thereby facilitating the use of what was previously wasted, unused space. In these particular examples, because the blow molding process involves the use of a parison with a continuous, unbroken surface (and thus, the mold itself cannot produce any holes in the blow-molded wall other than the hole or holes through which the fluid pressure is introduced), a section of the case wall is cut or burned after the blow molding process is completed and the case has been ejected from the mold. For example, cutting the inner wall was often accomplished with the use of a small circular saw blade mounted to a router and guided by a molded vertical lip surrounding the area to be cut. The router was fixed and the case was moved around the router axis by hand or by mechanical means. Round holes were often cut with hole saws, or occasionally, were burned.

Another, more improved method of removing a section of the inner wall of the case is to punch a hole in this wall during the blow molding process. Examples of such methods are disclosed in U.S. patent application Ser. Nos. 10/958,824 and 11/105,721, each of which is assigned to the assignee of the present application and are incorporated herein by reference. In these varieties, punches are used during the blow-molding process to produce the desired holes. The punch, when in an unactivated position, forms a portion of mold surface, against which the walls of the blow molded case are blown. Then, at a predetermined interval, before the walls of the case are fully hardened, the punch is moved to an activated position, creating a hole in the wall of the case.

One limitation such cases may still have in some applications, however, is their ability to accommodate compartments for accessories. For example, one common use for such cases is tools, such as a drill, which, in addition to the main tool, include other accessories, such as drill bits. However, when a hole is created in an inner case wall, a fair amount of the remaining portions of the wall may be required to provide support for the perimeter of the hole, which retains the main tool. Accordingly, the available space for additional holes in this inner wall for accommodating accessories is sometimes limited.

What is desired, therefore, is a blow molded case for housing an object as well as accessories of the object. What is further desired is a blow molded case that has a high carry capacity, yet is not heavy or cumbersome. What is also desired is a blow molded case that is easy and inexpensive to manufacture, does not produce residual sawdust and/or charred plastic, and does not require a long blow molding cycle.

SUMMARY OF THE INVENTION

Accordingly, it is an object of the present invention to provide a blow molded case that maximizes the amount of useable space between the inner and outer walls of the base portion of the case.

It is a further object of the present invention to provide a blow molded case that minimizes the size of the exterior of the case.

It is yet another object of the present invention to provide a blow molded case that does not require additional manufacturing steps after the blowing cycle.

In order to overcome the deficiencies of the prior art and to achieve at least some of the objects and advantages listed, the invention comprises a blow molded case for housing a first object and a second object, including a blow-molded, double wall base portion, the base portion comprising an outer case wall, an inner case wall for accommodating at least part of the first object, and a cavity at least partially enclosed by the inner and outer walls, and a lid portion connected to the base portion and moveable from an open position to a closed position such that, when in the closed position, the lid portion at least partially covers the inner case wall of the base portion, wherein the outer wall of the base portion has a hole therethrough for passing the second object through the outer wall and into the cavity.

In some these embodiments, the hole is a punched hole that corresponds to at least part of the outline of the second object. In some embodiments, the base portion has a mold parting line, the outer wall of the base portion includes a sidewall extending substantially perpendicular to the parting line, and the hole is located in the sidewall of the base portion. In certain of these embodiments, the sidewall of the base portion is arcuate, such that the hole therethrough is multi-planar. In some embodiments, the sidewall of the base portion includes a recess adjacent the hole.

In some these embodiments, the invention includes a receptacle insertable through the hole and into the cavity.

In other embodiment, the invention comprises a blow molded case for housing a first object and a second object, including a blow-molded, double wall base portion, the base portion comprising an outer case wall and an inner case wall for accommodating at least part of the first object, and a blow-molded, double wall lid portion connected to the base portion, the lid portion comprising an outer case wall and an inner case wall at least partially enclosing a cavity, the lid portion being moveable from an open position to a closed position such that, when in the closed position, the inner case wall of the lid portion at least partially covers the inner case wall of the base portion, wherein the outer wall of the lid portion has a hole therethrough for passing the second object through the outer wall of the lid portion and into the cavity.

In still another embodiment, the invention comprises a method for creating the base portion of a blow molded case having inner and outer case walls, the method including the steps of moving a first mold portion adjacent a second mold portion along a seam, thereby creating a cavity having a cavity surface, blowing the inner and outer case walls of the base portion of a case against the cavity surface, and creating a hole in the outer case wall of the base portion.

In some of these embodiments, the invention includes extending at least part of a punch parallel to the seam, through the outer case wall and into the cavity.

In yet another embodiment, the invention comprises an apparatus for creating the base portion of a blow molded case having inner and outer case walls, including a mold having first and second mold portions that, when located adjacent each other along a seam, at least partially enclose at least one cavity having a cavity surface, wherein the cavity surface includes outer and inner case wall portions, against which the outer and inner walls of the base portion of the case are blown, respectively, during blow-molding, and a punch having a punching surface, wherein, when the punch is in an unactivated position, the outer case wall portion of the cavity surface includes the punching surface and, when the punch is in an activated position, the punch is extended past the outer wall of the case and into the cavity such that a hole is created in the outer wall of the case.

In some of these embodiments, the outer case wall portion of the cavity surface includes a section substantially perpendicular to the seam, against which a sidewall of the outer wall of the base portion of the case is blown during blow molding, and the substantially perpendicular section includes the punching surface when the punch is in an unactivated position, and the punch is extended past the sidewall when the punch is in an activated position.

In certain of these embodiments, the substantially perpendicular section of the outer case wall portion of the cavity surface has a non-planar area. In some embodiments, the substantially perpendicular section of the outer case wall portion of the cavity surface or the punching surface of the punch includes a protuberance extending into the cavity adjacent the punching surface when the punch is in an unactivated position, such that a recess is formed in an outer surface of the outer case wall during blow molding.

BRIEF DESCRIPTION OF THE DRAWINGS

FIG. 5A is a cross-sectional view of the system for making the case of FIG. 1 with the punches in an unactivated position.

FIG. 5B is a cross-sectional view of the system of FIG. 5A with the punches in an activated position.

FIG. 5C is an isometric view of a punch of the system of FIG. 5A.

FIG. 5E is a cross-sectional view of the system of FIG. 5A with the punches slightly extended.

DETAILED DESCRIPTION OF THE DRAWINGS

Figure 1A:
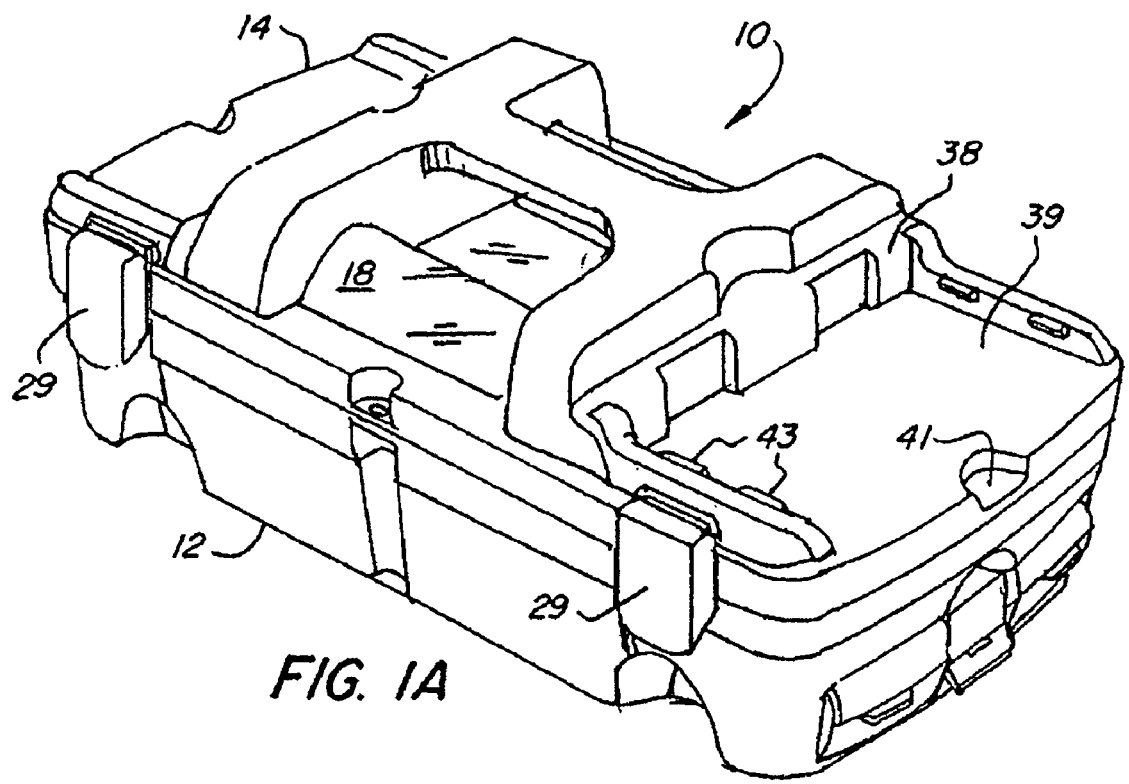
FIG. 1A is an isometric view of a double wall, blow molded case in accordance with the invention.
Figure 1B:
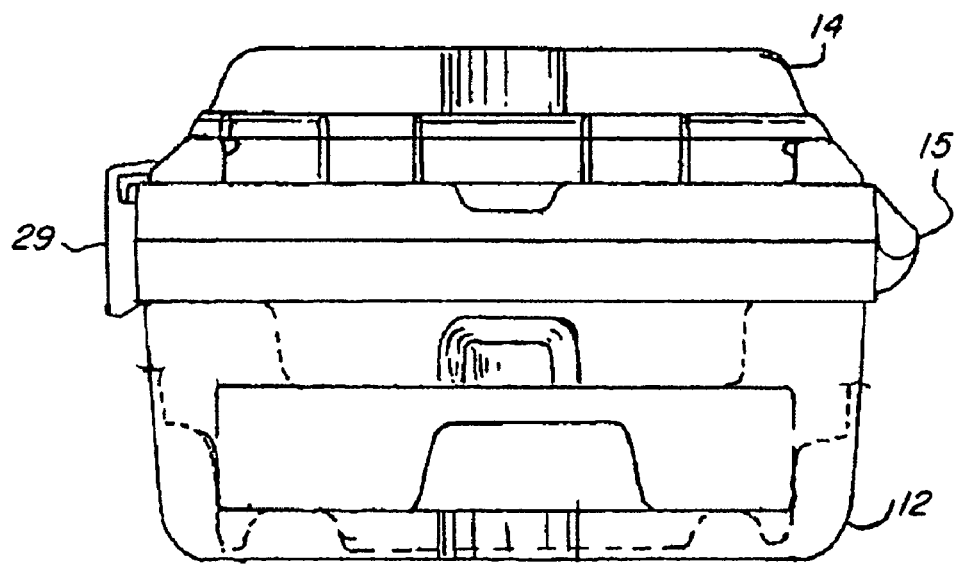
FIG. 1B is an end view of a double wall, blow molded case of FIG. 1.
Figure 2:
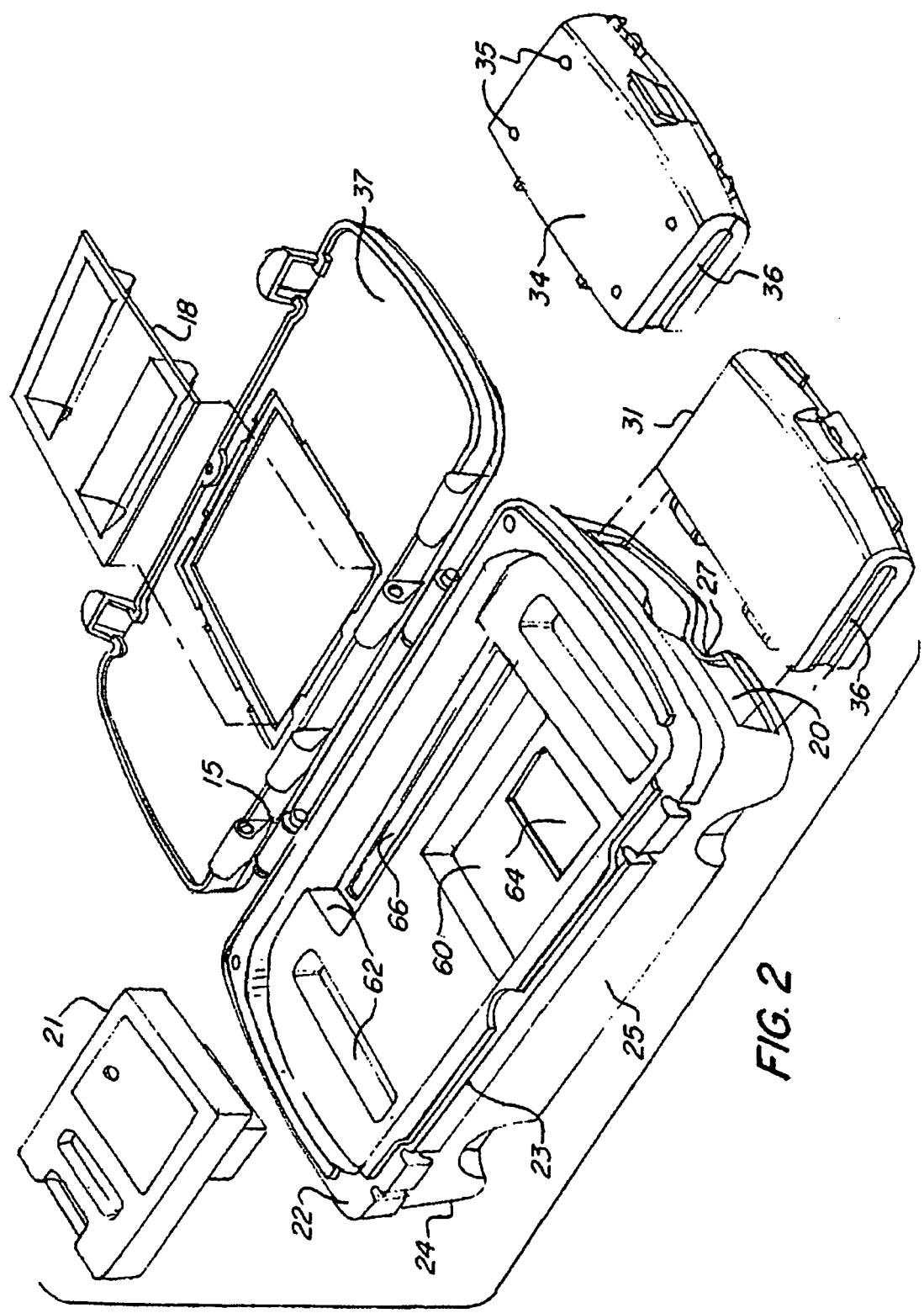
FIG. 2 is a perspective, exploded view of the case of FIG. 1 in the open position.

The basic components of one embodiment of a blow molded case in accordance with the invention are illustrated in FIGS. 1-2. As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

The case 10 includes a double wall base portion 12 and a lid portion 14 connected thereto. In some embodiments, the lid portion 14 is a separate piece that is connected to the base portion 12 after the blow molding process is completed via a hinge mechanism 15. However, like the base portion 12, the lid portion 14 may also be a blow molded article, and thus, in certain embodiments, the lid portion 14 is integrally formed with the base portion 12 during a single blow molding process.

Figure 4A:
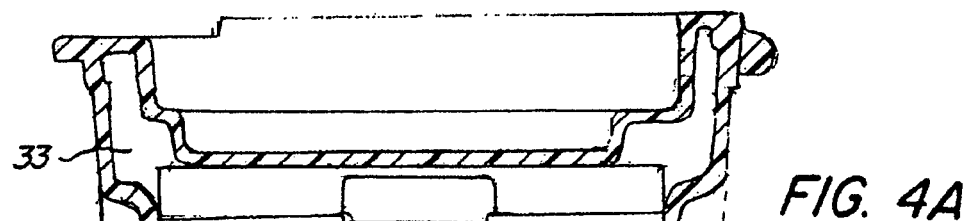
FIG. 4A is an end view, in partial cross-section, of the case along line A-A of FIG. 3.
Figure 4B:
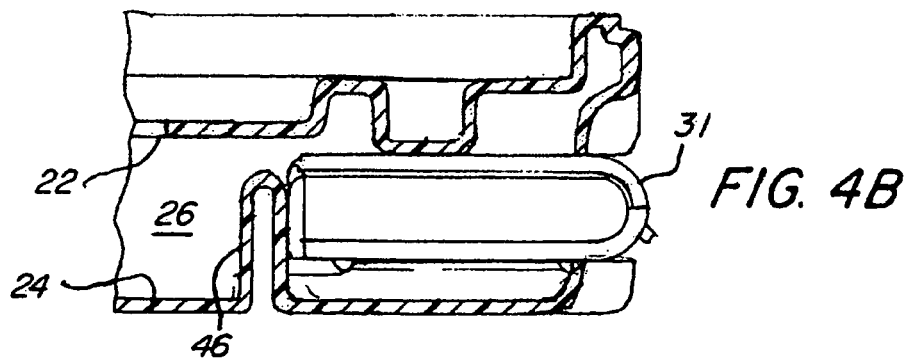
FIG. 4B is a side view, in partial cross-section, of the case along line B-B of FIG. 3.

The base portion 12 has an inner case wall 22 and an outer case wall 24, which at least partially enclose a cavity 26 (which is best illustrated in FIG. 4B). The inner case wall 22 is adapted to accommodate a first object 21, which may, for example, be a tool of some sort. The lid portion 14 is moveable between open and closed positions, such that, when in a closed position, the lid portion at least partly covers the inner case wall 22 of the base portion 12, including the first object 21 (and any other possible accessories) accommodated therein. The lid portion 14 typically includes at least one clasp 29 or other locking mechanism for keeping it in the closed position, and may include a translucent section 18 for viewing the object 21.

Any of various configurations may be employed for the surface of the inner case wall 22, including various recesses and/or holes therethrough in whatever shapes and sizes as may be appropriate to accommodate the tool, as well as any other accessories that it may be desired to carry in the case 10. For example, the inner case wall 22 may have a recess 60 for accommodating the first object 21, which may, as examples, be a tool or a primary container, and may, in some embodiments, include additional recesses 62 for accessories. In certain advantageous embodiments, the inner case wall 22 includes holes, such as punched holes 64, 66, for receiving the objects and utilizing some of the cavity 26 for accommodating same. Various mold planes and punches can be used to create any variety of through-holes, blind holes, flanges, or sidewalls for accommodating, and providing support for, these various objects, as is more fully taught in U.S. patent application Ser. Nos. 10/958,824 and 11/105,721. Similarly, the lid portion 14 may also include an inner case wall 37 with recesses and/or holes for accommodating the top of the objects when the case 10 is closed, as is described in the aforementioned applications.

The outer case wall 24 includes a sidewall 25 that runs around the perimeter of the base portion 12, including the front, back, and ends of the case 10 when oriented in an upright position. The sidewall 25 extends in a direction substantially perpendicular to a mold parting line 23 of the base portion 12, which parting line is the result of the inner and outer case walls 22, 24 being blown against a seam joining first and second portions of a mold, as is further explained below.

The sidewall 25 has at least one hole 20 that corresponds to the outline of a second object 31, which may, for instance, be a receptacle for holding various parts or accessories of a tool, such as a tray, a drawer, or a removable container of some sort. Accordingly, the receptacle 31 may be inserted through the hole 20 and into the cavity 26 between the inner and outer case walls 22, 24.

In embodiments where the lid portion 14 is also a double wall, blow molded article, the hole 20 may be formed in the outer case wall 38 of the lid portion 14 instead of the base portion 12. In other embodiments, a hole may be formed in both the base and lid portions 12, 14, such that the hole 20 in the lid portion 14 can accommodate a third object.

As shown in FIG. 4A, in certain advantageous embodiments, the outer wall 24 of the base portion 12 includes a plurality of ribs 32 for engaging the bottom 34 of the receptacle 31 when it is inserted into the hole 20. The ribs 32 serve both to guide the receptacle 31 as it is pushed back into the cavity 26 and, when fully inserted, help limit the movement of the receptacle 31 when the case 10 is moved.

In some embodiments, the base portion 12 includes a smaller cavity 33 near the top edge thereof, which creates a sort of pocket above the receptacle 31. This can be useful particularly, for example, in embodiments employing a drawer, as the cavity 33 can be employed to help retain the drawer 31 in a desired position or to provide a track feature if so desired.

As shown in FIG. 4B, in some embodiments, the base portion 12 has at least one protrusion 46 in the outer case wall 24, which extends inwardly toward the inner case wall 22 and substantially perpendicular to the parting line 23. Such protrusions can serve many purposes in the base portion 12.

For example, in some embodiments, a protrusion is specifically sized and shaped to correspond to a particular portion of the first object 21, and may be shaped to fit into a particular aperture or recess thereof, while in other embodiments, a protrusion may merely be shaped to correspond to a particular portion of the outline of the object 21 in order to help keep it in place, while in still other embodiments, protrusions may simply be positioned at a location that corresponds to the length or width of the object 21 in order to restrain its movement. In this way, various compartments may be created for various objects, such as a main section for the object 21 and auxiliary sections for cords or other accessories, as is more fully explained in the aforementioned applications.

In certain advantageous embodiments, a protrusion 46 is specifically positioned at a location corresponding to the length of the receptacle 31 in order to limit its movement into the cavity 26.

Figure 3:
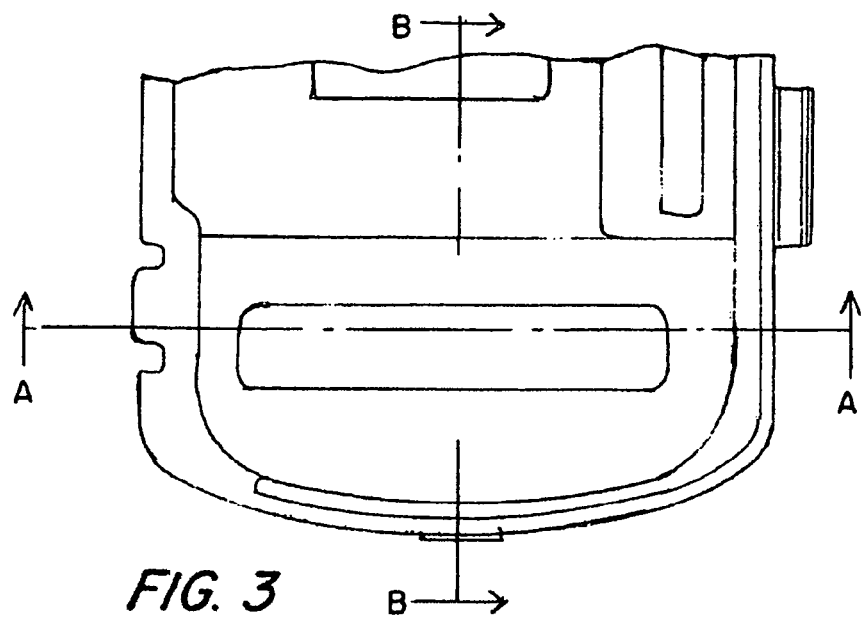
FIG. 3 is a plan view of the end of the case of FIG. 1.

In some embodiments, the sidewall 25 is non-planar. For example, as shown most clearly in FIG. 3, in some embodiments, the sidewall has a generally arcuate shape. Moreover, returning to FIG. 2, in certain advantageous embodiments, a recess 27 is provided in the sidewall 25 adjacent the hole 20, thereby resulting in a multi-planar surface. Accordingly, when the receptacle 31 is inserted into the hole 20 and pushed all the way into the cavity 26 until it abuts the protrusion 46, one can still easily grip the receptacle 31 to withdraw it therefrom because the recess 27 forms a finger-grip by which one can access the bottom of the receptacle 31. In particularly advantageous embodiments, a recess 27 is located adjacent the hole 20 both above and below the hole 20 for this purpose.

In some embodiments, the receptacle 31 includes a number of small bosses 35 on the underside 34 thereof for further engaging the ribs 32 and providing a small locking effect as the receptacle 31 is slid into the cavity 26. In certain embodiments, the receptacle 31 also includes tracks 36 along its sides for guiding and/or retaining the receptacle 31 in a particular portion of the case 10. For example, as shown in FIG. 1, in certain advantageous embodiments, the outer case wall 38 of the lid portion 14 includes a recessed portion 39 corresponding to at least part of an outline of the receptacle 31. The recessed portion 39 may have its own recess 41 to provide a finger grip, or protrusions 43 for engaging the tracks 36 of the receptacle 31. While the recessed portion 39 is shown in the lid portion 14, such a recess could also be formed in the base portion 12, depending on the particular size and shape of the base portion 12.

Figure 5D:
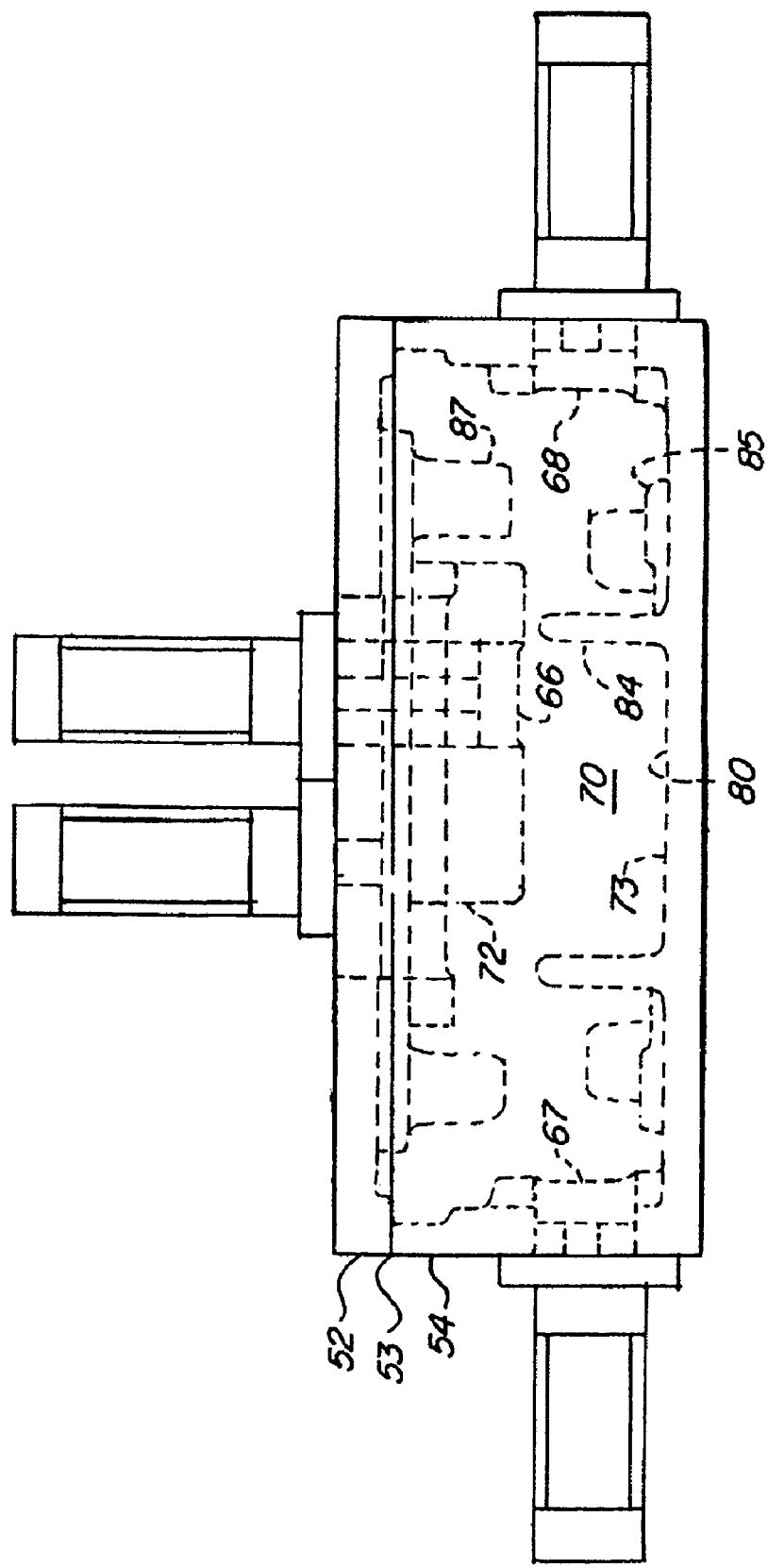
FIG. 5D is a partially exposed side view of the mold of FIG. 5A.

As illustrated in FIGS. 5-6, a system for creating the base portion 12 of the case 10 of FIG. 1 comprises a mold 50 including a first mold portion 52 and a second mold portion 54. The first mold portion 52 includes first, second, and third punches 56, 57, 58, having punching surfaces 66, 67, 68, respectively. When the first and second mold portions 52, 54 are separated, such as when a parison is being disposed in the mold 50, the punches 56, 57, 58 are in an unactivated position. As shown in FIG. 5A, when the first and second mold portions 52, 54 are moved adjacent each other along a seam 53 (i.e., when the mold 50 is closed), the punches 56, 57, 58 remain in the unactivated position while the parison is being injected with blowing fluid. Accordingly, portions of the punch 56 form part of the surface against which the inner case wall 22 of the base portion 12 is blown, and portions of punches 57, 58 form part of the surface against which the outer case wall 24 of the base portion 12 is blown. Later, when it is desired to punch holes in the inner and outer case walls 22, 24, the punches 56, 57, 58 are moved to an activated position, as shown in FIG. 5B.

The operation of the mold portions 52, 54 and the punches 56, 57, 58 will now be described. When the first mold portion 52 is adjacent the second mold portion, a cavity 70 is formed. For example, referring to FIG. 5D, when the punches 56, 57, 58 are in the unactivated position, the cavity 70 has a cavity surface 80 comprised of the mold surfaces 72, 73 of the mold portions 52, 54, respectively, and the punching surfaces 66, 67, 68. This cavity surface 80 defines the cavity 70. When blowing fluid is injected into the parison, the walls of the blow molded case are blown against the cavity surface 80.

As shown in FIG. 5E, in some embodiments, one or more of the punches 56, 57, 58 are in a slightly extended position as the walls of the case are blown. Because the punch protrudes out into the cavity 70, the plastic material thins around the edge of the punch. As a result, the punch will ultimately require less force in order to punch the hole 20 therethrough. Generally, the more the punch is extended, the thinner that portion of the sidewall 25 will be, therefore requiring less punching force to create a hole therethrough. Additionally, because this extension of the punch effectively creates an additional, thin wall extending into the cavity 70 perpendicular to the sidewall 25, this step can also be used to provide an additional wall member 59 around the inside of the hole 20 to act as a reinforcing flange therefor.

After a predetermined time interval, the punches 56, 57, 58 are moved from an unactivated position to an activated position, as illustrated in FIG. 5B. When this occurs, the punches 56, 57, 58 are extended past the walls 22, 24 of the base portion 12 of the case 10 and into the cavity 70, thereby creating corresponding holes therein. The punch 56, may have a punching surface 66 corresponding to the outline of a tool or other object to be housed in the case 10, and thus, a hole in the shape of the object 21 is created in the inner case wall 22. Similarly, the punches 57, 58 have a shape corresponding to the outline of the receptacle 31, such that holes are created in the sidewall 25 that are sized to receive the receptacle 31.

In some embodiments, a punch is partially extended when in the unactivated position in order to further shape the case walls 22, 24. For example, when in the unactivated position, punch 58 may protrude out beyond the mold surface 72 into the cavity 70. As a result, when the outer case wall 24 is blown against the cavity surface 80 (which includes part of the punch 58), the case wall 24 is formed around the punch 58. In this way, a recessed portion is formed in the sidewall 25.

This is particularly useful in embodiments where one desires an outer case wall 24 having a hole 20 where the hole itself is multi-planar. For example, while the finger-grip recess 27 discussed above may be created by using a mold portion 54 having a protuberance (not shown) extending into the cavity 70 parallel to the seam 53, this may also be accomplished with a punch 57 having a multi-planer punching surface 67. As shown in FIG. 5C, for example, a raised, rounded protuberance 44 of the punching surface 67 may protrude out into the cavity 70 when the punch 57 is in the unactivated position, such that the outer case wall 24 is blown around the protuberance 44 during blow molding. When the punch 57 is subsequently extended into the cavity 70, the multi-planar punching surface 67 creates a hole in the multi-planar sidewall 25 at all points at the same degree of extension.

In certain advantageous embodiments, the second mold portion 54 includes a protuberance 84 that extends into the cavity 70. The protuberance 84 can be any shape or size appropriate to create the desired protrusion 46 in the outer case wall 24. Accordingly, when the case wall 24 is blown against the cavity surface 80, protrusion 46 is created. In some embodiments, the protuberance 84 is specifically positioned at a location corresponding to the length of a receptacle 31 to be inserted through the punched hole 20. In certain embodiments, a protuberance 85 is provided to create the corresponding rib 32 for engaging the bottom of the receptacle 31. In yet other embodiments, a protuberance 87 is provided in the top mold portion 52, which can be used, for instance, to create the pocket 33.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. An apparatus for creating the base portion of a blow molded case having inner and outer case walls, comprising;
   a mold having first and second mold portions that, when located adjacent each other along a seam, at least partially enclose at least one cavity having a cavity surface;
   wherein said cavity surface includes outer and inner case wall portions, against which the outer and inner walls of the base portion of the case are blown, respectively, during blow-molding;
   a punch having a punching surface, wherein, when said punch is in an unactivated position, the outer case wall portion of said cavity surface includes said punching surface and, when said punch is in an activated position, said punch is extended past the outer wall of the case and into said cavity such that a hole is created in the outer wall of the case;
   wherein the outer case wall portion of said cavity surface includes a section substantially perpendicular to the seam, against which a sidewall of the outer wall of the base portion of the case is blown during blow molding; and
   wherein said substantially perpendicular section includes said punching surface when said punch is in an unactivated position, and said punching surface is extended past the sidewall when said punch is in an activated position.

2. The apparatus of claim 1, wherein said punching surface corresponds to at least part of the outline of an object to be inserted into the hole.

3. The apparatus of claim 1, wherein said substantially perpendicular section of the outer case wall portion of said cavity surface has a non-planar planar area.

4. The apparatus of claim 1, wherein said substantially perpendicular section of the outer case wall portion of said cavity surface includes a protuberance extending into said cavity adjacent said punching surface when said punch is in an unactivated position, such that a recess is formed in an outer surface of the outer case wall during blow molding.

5. The apparatus of claim 1, wherein, when said punch is in a third position, said punching surface is extended past said cavity surface to a lesser extent than when in the activated position such that a wall member is formed around part of said punch during blow molding.

6. The apparatus of claim 1, wherein said punching surface includes a protuberance extending outwardly therefrom such that a recess is formed in an outer surface of the outer case wall during blow molding.

7. The apparatus of claim 1, wherein the outer wall portion of said cavity surface includes a protuberance extending into said cavity substantially perpendicular to the seam and positioned relative to said punching surface when said punch is in an unactivated position at a distance corresponding to the length of an object to be inserted into the hole, such that movement of the object into said cavity is limited thereby.

8. The blow molded case of claim 7, wherein the outer wall portion of said cavity surface has a plurality of ribs for creating corresponding ribs on an inner surface face of the outer wall of the base portion of the case for engaging a bottom surface of the object to be inserted into the hole.

9. An apparatus for creating the base portion of a blow molded case having inner and outer case walls, comprising;
   a mold having first and second mold portions that, when located adjacent each other along a seam, at least partially enclose at least one cavity having a cavity surface;
   wherein said cavity surface includes outer and inner case wall portions, against which the outer and inner walls of the base portion of the case are blown, respectively, during blow-molding; and
   a punch having a punching surface, wherein, when said punch is in an unactivated position, the outer case wall portion of said cavity surface includes said punching surface and, when said punch is in an activated position, said punch is extended past the outer wall of the case and into said cavity such that a hole is created in the outer wall of the case; and
   wherein the outer wall portion of said cavity surface includes a protuberance extending into said cavity substantially perpendicular to a direction of travel of the punch as the punch moves from the unactivated position to the activated position.

10. The apparatus of claim 9, wherein the outer wall portion of said cavity surface has a plurality of ribs for creating corresponding ribs on an inner surface of the outer wall of the base portion of the case for engaging a bottom surface of an object to be inserted into the hole.

* * * * *